Jan. 17, 1956  A. RUSCH  2,731,376
METHOD OF MAKING HOLLOW LAMINATED ARTICLES FROM UNWOVEN FABRIC
Filed Dec. 3, 1953  3 Sheets-Sheet 1

INVENTOR,
ADOLPHE RUSCH.
BY
Harry M. Saragovitz
ATTORNEY.

Jan. 17, 1956  A. RUSCH  2,731,376
METHOD OF MAKING HOLLOW LAMINATED ARTICLES FROM UNWOVEN FABRIC
Filed Dec. 3, 1953  3 Sheets-Sheet 2

INVENTOR,
ADOLPHE RUSCH.
BY
Harry M. Saragovitz
ATTORNEY

Jan. 17, 1956  A. RUSCH  2,731,376
METHOD OF MAKING HOLLOW LAMINATED ARTICLES FROM UNWOVEN FABRIC
Filed Dec. 3, 1953  3 Sheets-Sheet 3

INVENTOR,
ADOLPHE RUSCH
BY
Harry M. Saragovitz
ATTORNEY.

United States Patent Office 2,731,376
Patented Jan. 17, 1956

2,731,376

METHOD OF MAKING HOLLOW LAMINATED ARTICLES FROM UNWOVEN FABRIC

Adolphe Rusch, Rumson, N. J., assignor to the United States of America as represented by the Secretary of the Army Application December 3, 1953, Serial No. 396,086

7 Claims. (Cl. 154—83)

(Granted under Title 35, U. S. Code (1952), sec. 266)

The invention described herein may be manufactured and used by or for the Government for governmental purposes without the payment to me of any royalty thereon.

This invention relates to an improved process for manufacturing nonwoven cloth, laminated articles, and the like.

In general, the fabric made by the process described herein consists of layers or plies of unwoven warp and filler threads. The finished product may be made to contain any number of picks or ends per inch. Threads of different types can readily be incorporated in the cloth to provide properties such as great strength, fine or coarse finish, etc. For commercial purposes, yarns of different colors may be incorporated in the fabric for special decorative effects. The fabric may be bonded together by resin or any other type of adhesive, according to the material used and the fabric properties desired. The method is applicable to thread of any type, including glass, cotton, rayon, nylon, plastic, metal, silk, etc. and the thread may be either flat or round, roving or yarn.

It is an object of this invention to make a non-woven cloth by a method which is simpler and less expensive than methods in use heretofore.

It is a further object of this invention to make a non-woven cloth in which the number of ends and picks per inch may be very accurately controlled.

Another object of the invention is to provide a method for making a cloth of the type above, in which the angle between the warp and filler threads may be very accurately controlled.

A further object of the invention is to provide a process for making non-woven cloth in which special decorative effects may easily be incorporated in the cloth.

It is another object of the invention to provide a method of manufacturing non-woven cloth at a very rapid rate.

A further object of the invention is to provide a method of making laminated articles which have extremely high impact resistance and light weight.

Another object of the invention is to provide a new method for making laminated articles such as containers, battery cases, and the like.

Another object of the invention is to provide a new method for making laminated sheets.

Another object of the invention is to provide a new article of manufacture consisting of glass roving bonded with polyester resin.

A further object of the invention is to provide a method for preventing delamination of laminates made of glass roving or the like.

In general, a laminated article or non-woven cloth is made in accordance with this invention by spinning a form the shape of the article about a first axis through the form, and feeding the thread from which the cloth or article is to be made onto the form while moving the point from which the thread is fed along a line parallel to the spin axis. The form is then spun about a second axis angularly disposed with respect to the first axis, and the thread fed onto the form while moving the point from which the thread is fed along a line parallel to the second axis. The angle between the warp and filler threads depends upon the angle between the spin axes. The warp and filler threads are made to adhere to one another by applying an adhesive to the thread, preferably prior to feeding it onto the form. In order to increase the strength of the finished product, it may be cured by heat and/or by placing it in a press and applying pressure thereto.

The features of my invention which are believed to be novel are set forth with particularity in the appended claims. The invention itself, however, both as to its organization and method of operation, can best be understood by reference to the following description taken in conjunction with the accompanying drawings, in which:

Figure 1:
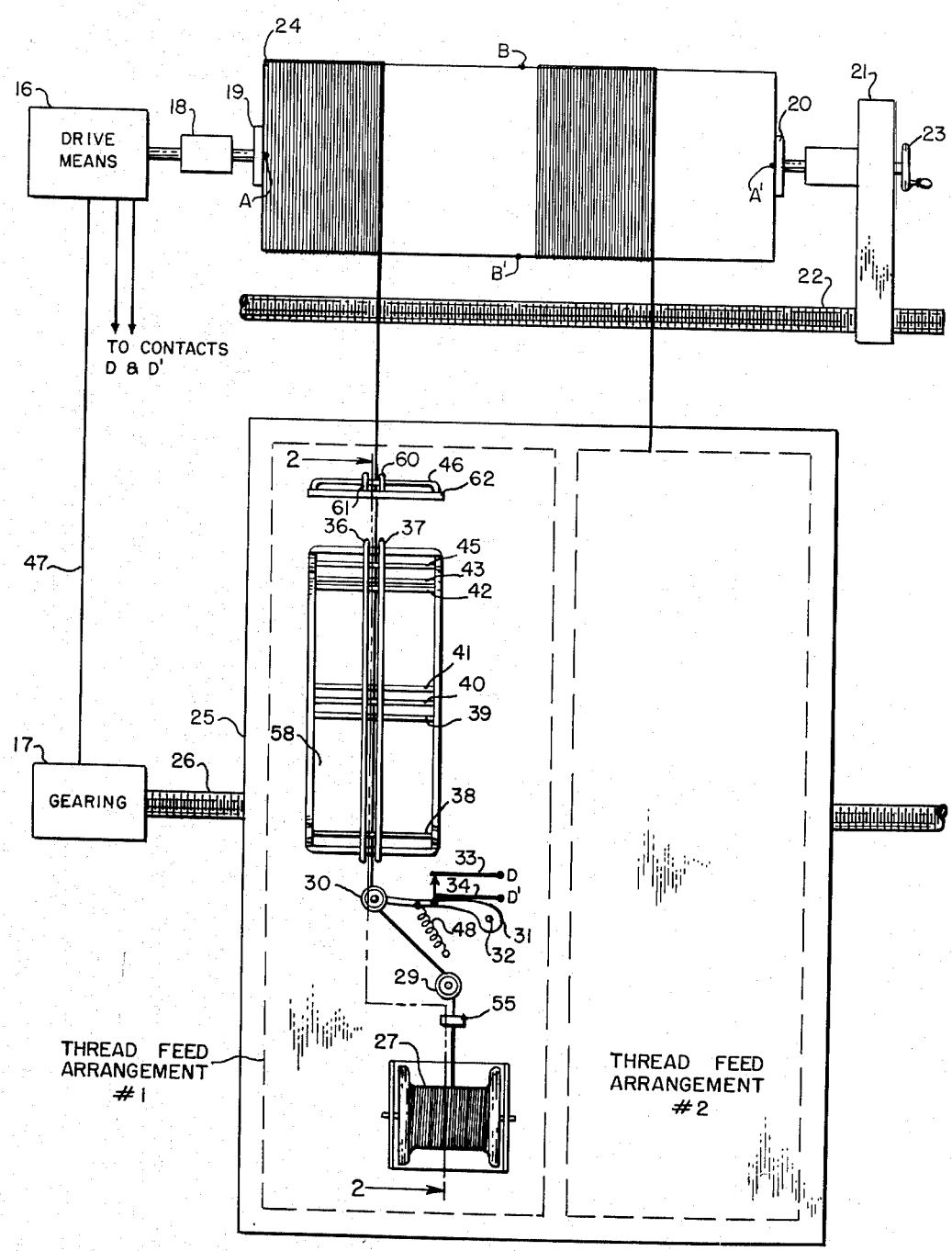
Fig. 1 is a plan semi-diagrammatic view of an apparatus for making a laminated article in accordance with the present invention.

In order to better understand the general inventive concept disclosed herein, the invention will be explained in terms of the manufacture of two specific articles, one a battery case made of glass roving or glass thread, and the other laminated sheets made of glass roving or glass thread. However, it is to be understood that the invention is neither limited to the manufacture of these two specific articles nor to the use of this specific material.

As used herein, the term "roving" means a strand composed of a plurality of substantially parallel, continuous, unspun filaments of material. The term "yarn" refers to a strand composed of filaments of material which are twisted or spun together. The term "cloth" refers to conventional woven cloth having warp yarns, and filler yarns over and under the warp yarns. The term "mat" refers to random filaments of material of short length pressed into a flat sheet. The term "impact resistance" refers to the resistance of an object to sudden shocks. It is measured in the laboratory by dropping a standard weight from successively higher heights onto a predetermined point on said object until the object cracks or ruptures. The instrument actually used to check the impact resistance of the products to be discussed below comprised a specially shaped 4⅔ lb. weight which could be dropped from successive heights onto the object. The maximum range of this instrument was 50 inches.

The manufacture of storage battery cases from glass fibres was prompted by certain deficiencies in the commercial hard rubber storage battery cases. Perhaps the most important of these deficiencies is poor impact resistance (about 2 inches). Hence, whenever any unusual stress, such as a sudden jar or shock, is applied to the case, the case may be cracked and the battery thereby destroyed.

In accordance with one prior-art method of making a glass laminate battery case of high impact resistance, a plurality of sheets of glass cloth are cut into a pattern and folded over a form. The sheets are held in place by means of a cord or glass thread fastened around the sheets, holding them to the form. After the sheets are in place, the form and the sheets are clamped between the plates of a press and an adhesive such as polyester resin is forced through an aperture in one of the plates until the glass sheets are saturated with resin. Pressure may then be applied to the plates and the structure cured. After the curing process, the resultant hard laminated case is removed from the mold.

The product made by the process described above was tested and found to have an impact resistance of approximately 50 inches. However, this case has two important disadvantages. First, it was found that the resin did not always penetrate all of the layers of glass cloth. In such instances, the batteries were found to leak. Second, the battery is too expensive. Glass cloth costs about $1.50 per pound, and a great deal of it is wasted in making the case. Furthermore, the many hand operations required make labor costs excessive.

In order to reduce the cost of the battery, glass mat which costs approximately 60¢ per pound was substituted for the glass cloth. The resultant battery had an impact strength of only 18 inches which, although superior to the commercial hard rubber case, is inadequate for certain uses.

Upon analysis, it was found that the glass mat case had a composition of about 40% glass and 60% resin, whereas the glass cloth case was about 60% glass and 40% resin. It has been experimentally determined that the impact strength of glass laminate is directly related to the percentage of glass in the laminate, as is borne out by the results above.

Figure 2:
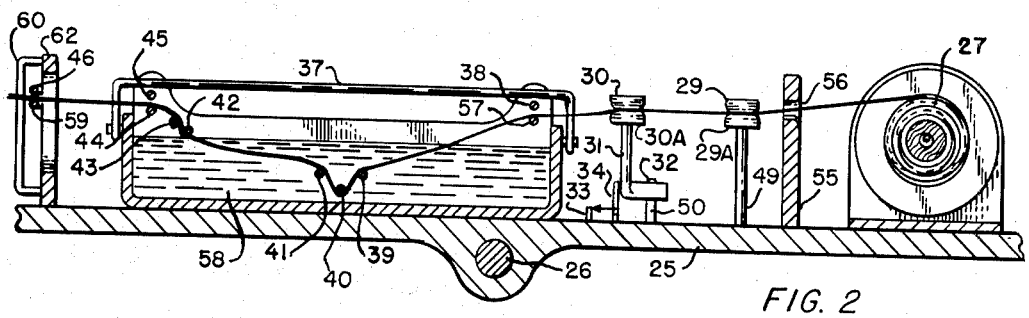
Fig. 2 is an enlarged, cross-sectional view along line 2—2 of Fig. 1.

Referring now to Figs. 1 and 2, there is shown an apparatus for making a battery case in accordance with the present invention. A form 24, the shape of the battery, is mounted between support 19 and support 20 of a device for spinning the form. The position of support 20 may be adjusted by means of tail stock 21 which is movable along shaft 22 by means of handle 23. The chuck 18, which is connected to support 19 is driven by means of drive means 16 which is adjustable in speed. Drive means 16 also drives gearing 17 through mechanical connection 47. Gearing 17 has a variable speed ratio. Threaded shaft 26 is driven by gearing 17 and the rotation of shaft 26 causes movement of a carriage 25 in a direction parallel to the spin axis of member 24. Members 26, 17, 16, 18, 19, 20, 21, 22 and 23 may comprise a common lathe.

Mounted on carriage 25 is an arrangement for feeding one or more threads onto form 24. Figs. 1 and 2 illustrate the simultaneous feeding of two such threads onto the form; however, since both feeding arrangements are identical, only one is shown in detail. A spool of glass roving 27, feeds a thread through an aperture 56 in member 55 to brake members 29, 29A, and 30 and 30A. Brake members 29, 29A are mounted on a support 49 and brake members 30, 30A on a swinging arm 31 pivotal on a pivot 32 on support 50. Spring 48 (shown only in Fig. 1) applies tension to arm 31 in the direction of spool 27. After leaving brake 30, 30A, the thread passes through glass guide rods 38, 57 into a bath 58 containing polyester resin. Glass rods 39, 40 and 41 serve to keep the thread immersed in the resin and rods 42, 43 and 44 serve to wipe the excess resin from the thread. Rod 45 is merely a guide. Glass rods 36, 37 serve to center the thread in the bath. After leaving wiper rod 44, the thread passes through glass rods 46, 59, 60 and 61 mounted on frame 62 onto form 24. Switch contacts 33 and 34 are normally closed when the thread is being properly applied to form 24. Points D, D' lead to the drive means. When the switch contacts are opened, the drive means is stopped.

In operation, the form 24 is first mounted between the centers A, A' of one pair of opposite sides of the form. The thread is then fastened to one end of the form 24, the carriage 25 positioned so that the feedpoint (the point where the thread passes through the rods 46, 59, 60, 61) is adjacent said end of member 24, the gearing 17 adjusted to give the desired number of ends per inch, and the drive means started. This causes the form 24 to rotate and the thread to feed onto the form as the carriage and feedpoint move in a direction parallel to the axis of rotation. The tension applied to the thread may be adjusted by adjusting the weight of brake members 30 and 29, the greater said weight, the greater the tension applied to the thread and the tauter the thread wound onto the form. This thread tension maintains swinging arm 31 in the position shown in Fig. 1 and this keeps switch contacts 33 and 34 closed. Should the thread break, spring 48 draws back arm 31 which opens contacts 33, 34 and stops the drive means 16. Although not shown, means may be provided to also operate an alarm device when a thread is broken. If greater speed of manufacture is desired, two or more feeds may be used, as indicated in Fig. 1.

After the form 24 is completely covered with glass roving, it is removed from between the turning mechanism and then remounted from points B, B', the centers of a second pair of opposite sides of the form. The spinning and feeding process described above is then repeated. This results in the form having two sides covered with two layers of glass roving and four sides covered with one layer of glass roving.

Form 24 is then again removed from the turning mechanism and remounted from the centers of the third pair of opposite sides of the form, and the process described above again repeated. The form now has two layers or plies of glass roving on each side thereof. A laminated article having any number of layers or plies desired may be manufactured by repeating the steps described above the desired number of times.

After the desired number of plies are obtained, the resultant structure may be mounted in a press and pressure applied in order to cure the laminate. With polyester resins, pressures on the order of contact to 100 pounds per square inch have been used with satisfactory results. In order to speed the curing process and to increase the strength and heat resistance of the laminate, heat may also be applied. For example, using a polyester resin such as Laminac or Paraplex, the laminate may be heated for about ¾ of an hour at about 210° F. while under a pressure of about 50 pounds per square inch to speed the curing and increase the strength thereof.

After the curing step, the finished laminated article is removed from the form by cutting through the laminate around the periphery of the form. To facilitate the removal of the laminate, the form is usually coated with a lubricant such as silicone grease prior to the application of thread.

In the method described, resin is applied to the thread prior to feeding it onto the form, however, it is to be understood that the resin may be applied after the thread is on the form. The method described has the advantage that all threads are sure to be coated and the finished product is therefore certain to be of uniform strength throughout. A bath is shown for applying the resin, however, a resin spray, a roller or drum immersed in resin, or any other method known in the art for applying resin to thread may be used instead.

Although in the method above, polyester resin is used as the adhesive, it should be understood that the invention is not limited to this material. For example, a very satisfactory battery case may be manufactured with glass roving, using epoxy resin as the adhesive. This case is even stronger than the polyester resin glass roving case, however, epoxy resin is quite expensive, at present.

In some battery cases actually built of glass roving and polyester resin, each strand fed onto the form comprised ten ends of what is commonly known as 150s of roving. (150s is a term of art used to describe glass roving having a thickness such that 15,000 yards thereof weigh a pound.) The finished case had six layers or plies and each layer had 10 to 12 strands per inch. Adjacent plies were at right angles. Sufficient pressure was applied in the curing process to make a laminate which consisted of 75% to 80% glass and the remainder resin. The thickness of the laminate was slightly greater than $\frac{1}{16}$th of an inch. These cases were not affected by impact shocks of 50 inches, the extreme range of the test equipment.

One important advantage of the glass roving battery case is that it is much cheaper to manufacture than the glass cloth case. Glass roving costs only about 40¢ per pound, as compared to $1.50 per pound for glass cloth. The finished glass roving battery case weighs about 3¼ pounds, including waste, which gives a cost of materials of about $1.04 for glass roving (80% of weight) and about 40¢ for resin (about 20% by weight at a price of about 60¢ per pound), a total of $1.44. The glass cloth case, on the other hand, weighs about 5 pounds, including waste. As mentioned in the foregoing discussion, this case consists of about 60% glass and 40% resin, giving a cost of materials of about $4.50 for glass and $1.20 for resin, a total price of $5.70. Furthermore, as can be readily seen, there is a great deal less labor involved in the manufacture of the glass roving by the method described than there is in the manufacture of the glass cloth case.

Another advantage of a glass roving battery case is that each strand is fully coated with resin and the finished product is therefore perfectly uniform. There is no possibility of leaks developing as in the previously described glass cloth case.

Still another advantage of the glass roving battery case is that the wall thickness and weight of the case are much less than that of the conventional hard rubber battery. This is important, for it allows for the use of more electrolyte for a given battery size, or, where portability and therefore reduced size and weight are important, the reduction of battery size and weight without reduction of the volume of electrolyte.

Figure 3:
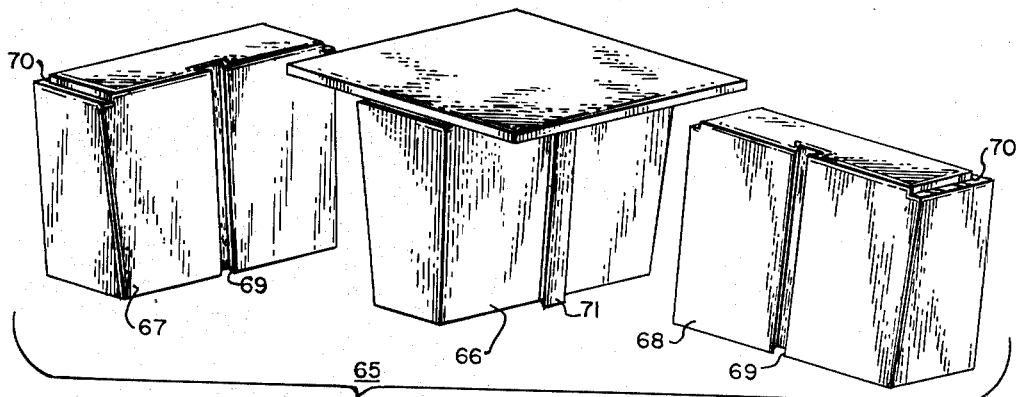
Fig. 3 is an exploded view of a form about which a battery case is woven.

Fig. 3 illustrates an improved form for the making of glass roving battery cases. This form 65 comprises three sections, 66, 67, and 68. The form may be made either of metal or of wood covered with a smooth metal plate. The form may be tapered ever so slightly toward the base thereof to facilitate removal of the case. This taper is exaggerated in Fig. 4. The three sections of the form may be keyed together so that they remain together as a unit by means of conventional joints 69, 71. Groove 70 extends around the periphery of the form.

Figure 4:
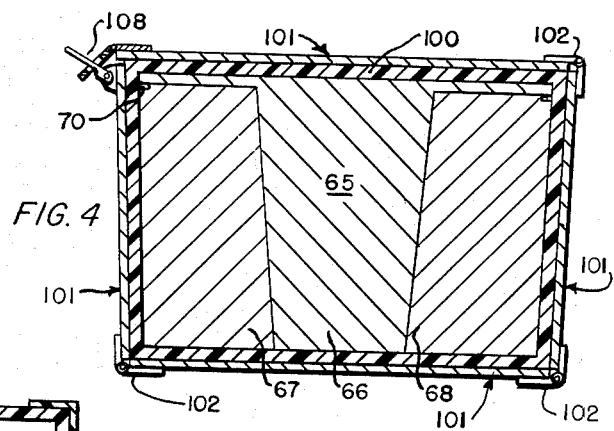
Fig. 4 is a cross-sectional view of a battery case made of glass laminate being cured in a special press.
Figure 5:
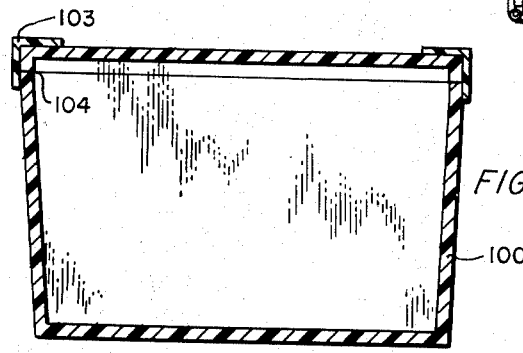
Fig. 5 is a cross-sectional view of a battery case.

Fig. 4 demonstrates one of the manufacturing steps using this form and Fig. 5 shows a finished battery case. In Fig. 4 there is shown the form 65 covered with a layer of laminate 100, which is applied to the form in the manner previously described in connection with Figs. 1 and 2. The entire form, including the laminate, is placed in a press 101, which is shown as being hinged by a number of hinges 102 and which includes a means, such as lever 108, for tightening the press and thereby applying pressure to the laminate. This figure is meant to be illustrative only, as the press may consist of separate plates, an automatic hydraulic press or any other press well known in the art, shaped to fit the case. As previously mentioned, pressures on the order of contact to 100 pounds produced a satisfactory polyester resin-glass roving laminate. With other adhesives, pressures on the order of 1000 or more pounds per square inch may be required.

After the curing step, the form and hardened laminate is removed from the press and the laminate cut around the periphery of the form adjacent the groove 70. Section 66 is then separated from the remainder of the form. The portion of the laminate on this section becomes the top of the battery case. The bottom portion of the battery case may now readily be separated from the remainder of the form. To further facilitate the separation of the battery case from the form, the exterior of the form is normally coated with a lubricating substance such as silicone grease prior to winding the thread thereon.

The top of the battery case may be fastened to the bottom of the case by means of a glass roving or cloth angle bracket 103, as illustrated in Fig. 5. A suitable adhesive material is epoxy resin. Other suitable means for fastening the top of the case to the bottom thereof include conventional asphalt battery sealing compound, or cloth tape fastened to the case by epoxy resin.

It will be appreciated that Fig. 5 merely illustrates the basic elements of a battery case. When used for a storage battery, holes are cut in the top of the case to house the battery terminals. The case is also separated into compartments by bonding laminated glass sections into the battery, by means of epoxy resin or asphalt sealing compound.

While the manufacturing process above has been related only to a battery case, this process has very many other applications. It may be used, for example, for manufacture of items such as automotive bodies, boats, structural parts, radomes, and decorative objects of all kinds, such as trays, table tops, etc. In particular, using glass roving, items may be made having exceedingly high impact resistance such as bullet-proof vests, shelters, insulators, etc.

Figure 6:
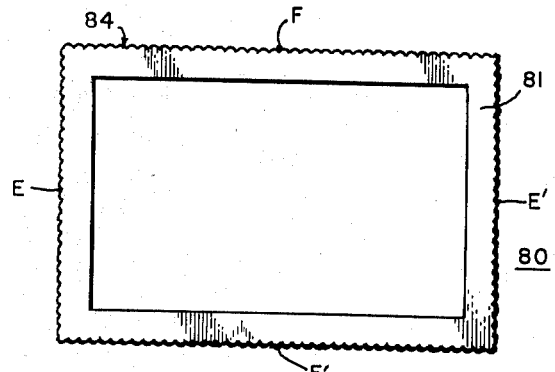
Fig. 6 is a plan view of a form on which laminated flat sheets are wound.

Figs. 6, 7, 8 and 9 relate to the process of manufacturing laminated sheets, using the principles described in connection with Figs. 1 and 2. Fig. 6 is a plan view of a form 80 on which the glass roving laminate may be wound. It consists of a top section 81, shaped like a picture frame and having a knurled edge 84 which provides an uneven surface for holding the roving in place. The roving is wound onto the form by first spinning the form about an axis through the centers E, E' of one pair of opposite sides and then spinning the form about an axis running through the centers F, F' of the other set of sides thereof.

Figure 7:
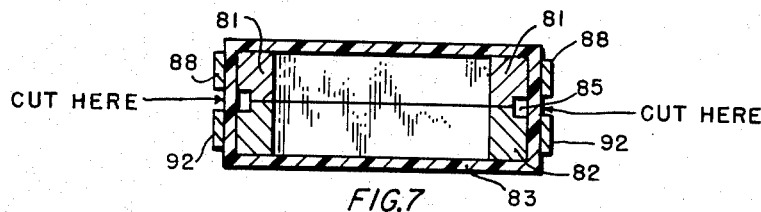
Fig. 7 is a cross-sectional view along line 7—7 of Fig. 9.
Figure 9:
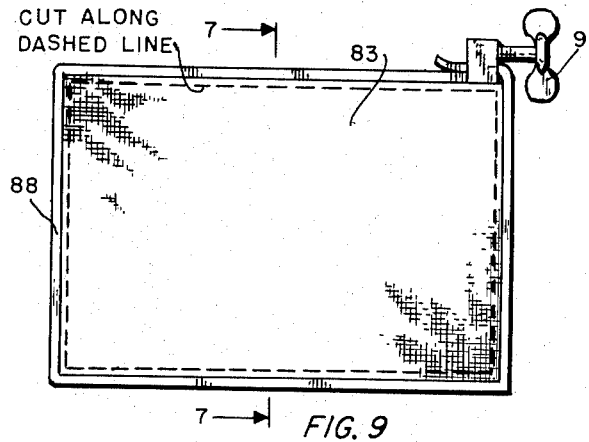
Fig. 9 is a plan view of a laminated sheet clamped to a section of the form on which it is wound.

Figs. 7 and 9 are different views of the form after the glass roving has been wound thereupon. Fig. 7 is a cross-sectional view of the form illustrating the two sections thereof, 81 and 82. These two sections may be held together by means of a keyway such as a conventional carpenter's joint (not shown) or by means of a few strands of glass roving. Around the periphery of the form is a slit 85 to facilitate removal of the laminated sheets from the form as will be described more fully below. A laminate 83 is wound over a form by the method previously described. Clamps 88 and 92 hold the laminate in place.

Fig. 9 illustrates clamp 88, which may be tightened by means of handle 91. The handle turns a worm gear which causes takeup of the clamp member around the periphery of the form. Although this special clamp is illustrated, it should be understood that the invention would work equally well with a rubber band or any other type of conventional clamp for clamping the cloth in place.

In operation, the two sectioned form 81, 82, is mounted between the centers of a lathe or other device for spinning the form and the glass roving fed onto the form from a feedpoint moving in a direction parallel to the direction of the spin axis. (Instead of flat plates 19, 20 (Fig. 1), clamps having jaws may be used to hold the form rigidly in place.) The form is then spun about a second axis passing through the centers of the second pair of sides of the form. The steps above are repeated until a laminate of the desired thickness is built up on the form. The laminate is then clamped to each section of the form by means of clamps 88 and 92, respectively, and the laminate cut around the periphery of the form adjacent groove 85. The two sections of the form are then separated and the laminate mounted on each section cured by placing said laminate between the plates of a press.

Figure 8:
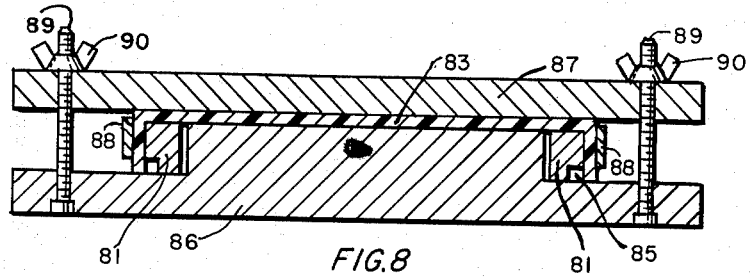
Fig. 8 is a cross-sectional view illustrating the curing of a laminated sheet between the plates of a press.

Fig. 8 illustrates a special type of press which may be used for the curing step. It consists of a bottom plate 86 shaped as shown, so as to fit within the picture frame, and a top plate 87 which fits over guide rods 89 and is tightened in place by means of wing nuts 90. The pressure used to cure the laminate depends upon the adhesive used, as explained above in connection with the battery case. After the curing step, the sheet of laminate may be separated from the picture frame section by cutting along the dashed line shown in Fig. 9. If desired, a groove may be cut in the form underneath this line to facilitate the cutting operation. To facilitate removal of the sheet of laminate, the form is usually coated with silicone grease prior to winding the glass roving thereon.

Although the description above relates to the manufacture of glass roving laminate sheets, the process is equally applicable to many other types of laminates. For example, if a cloth of higher quality is desired, that is, one with a smoother or finer surface, glass yarn may be used instead of glass roving. Furthermore, for commercial uses, such threads as cotton, silk, nylon, plastic, rayon, metal, etc. may be employed. Adhesives other than polyester resin may be used according to the fabric properties desired. Decorative effects may be obtained by using fabrics of different colors. For example, plaid and other common textile designs may readily be simulated. Furthermore, it should be appreciated that although in the process illustrated the plies run at right angles to one another, it is possible to change this angle by changing the angle made by the spin axes and the rate at which the feedpoint moves. It should also be understood that although a rectangular frame is illustrated, the frame may be of any shape. Finally, it should be understood that the manufacturing process may be speeded up by feeding a plurality of threads onto the form simultaneously.

Some laminate sheets manufactured according to the process described above, made of glass roving and bound by polyester resin and having a thickness of approximately 1/16 of an inch have been impact tested and found to have impact strengths of greater than 50 inches.

Instead of using a picture frame-two sectioned form on which to wind the laminate, a flat plate form may be used. This has the advantage that both sheets of laminate (the sheets on both sides of the plate) may simultaneously be cured between a single set of platens. However, the method has the disadvantage that the cured laminate is more difficult to remove from the form.

One problem which has arisen in the manufacture of laminated articles of glass roving is delamination, the peeling of threads from the surface of the laminate. This occurs at the cut end of the laminate which is subject to abrasion, such as along the dotted line in Fig. 9 after the laminate has been cut from the frame. A procedure for solving this problem is illustrated in Fig. 10 which shows a glass roving laminate 105 and glass mats 106—107 bonded to the laminate by means of polyester resin.

Figure 10:
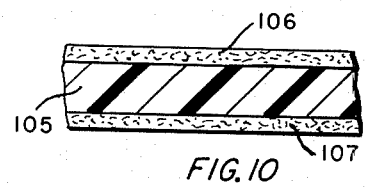
Fig. 10 is a cross-sectional view of a laminate, including outer layers of glass mat.

The process for applying glass mat to the laminate, as illustrated in Fig. 10, is to apply polyester resin to each plate of a press, such as press 86, 87 of Fig. 8, to apply a glass mat over each coated plate, and then to place the uncured laminate between the mats. Pressure and heat are then applied to cure the fabric and make it into an integral sheet. The pressure causes the resin to saturate the mats and bond them firmly to the roving. If a fine finish is desired, glass mats commonly known as lamp shade mats may be used. Otherwise, other coarser grades of mat may be used.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A method of manufacturing a hollow, rectangular, laminated article, comprising the steps spinning a rectangular parallelepiped form about a first axis through the form, said axis passing through the centers of one pair of opposite walls of said form, feeding thread onto said form from a feedpoint while moving said feedpoint in a direction substantially parallel to said axis along the entire extent of said form, spinning the form about a second axis through the form, said second axis passing through the centers of a second pair of opposite walls of said form, feeding thread onto said form from said feedpoint while moving said feedpoint in a direction substantially parallel to said second axis along the entire extent of said form, spinning the form about a third axis through the form, said third axis passing through the centers of the third pair of opposite walls of said form and feeding thread onto said form from said feedpoint while moving said feedpoint in a direction substantially parallel to said third axis along the entire extent of said form.

2. The method of manufacturing as set forth in claim 1, including the further steps of repeating the spinning and feeding steps set forth until the desired number of laminating layers are built up.

3. The method set forth in claim 2, including the further steps of coating said form with lubricating material prior to applying thread to the form to facilitate removal of the finished product, and applying an adhesive substance to the thread while feeding it onto the form.

4. The method set forth in claim 3, in which said adhesive substance is applied by passing said thread through a bath of said substance prior to feeding it onto said form.

5. The method set forth in claim 3, including the further step of applying pressure to the laminating layers after completion of the feeding operation so as to effect the curing thereof, and removing the finished product from the form.

6. The method as set forth in claim 5, in which said last step is effected by cutting through the laminating layers about a perimeter of said form, and then separating the finished product in sections from said form.

7. A method of manufacturing a storage battery case comprising the steps of applying silicone grease to a substantially rectangular hollow form, spinning the form about a first axis through the form, said axis passing through the centers of a first pair of opposite sides of said form, feeding glass yarn from a spool through a polyester resin bath through a reed onto said form while moving said reed in a direction substantially parallel to said spin axis along the entire extent of said form, repeating the immediately preceding step first while spinning said form about a second axis through said form and then about a third axis through said form, said second axis passing through the centers of a second pair of opposite walls of said form and said third axis passing through the centers of the third pair of opposite walls of said form, repeating the spinning and feeding steps set forth above until the desired number of laminating layers are built up, applying pressure to the laminate covering the form after the completion of the feeding operations set forth above so as to cure said laminate, removing the resultant structure from said form by cutting through the cured laminate about the longest perimeter thereof parallel to the base of said form.

References Cited in the file of this patent

UNITED STATES PATENTS

| | | |
|---|---|---|
| 785,321 | McLaughlin | Mar. 21, 1905 |
| 1,679,721 | Howard | Aug. 7, 1928 |
| 1,771,216 | Gossler | July 22, 1930 |
| 2,107,067 | Alderfer | Feb. 1, 1938 |
| 2,148,510 | Simison | Feb. 28, 1939 |
| 2,352,055 | Witt | June 20, 1944 |
| 2,574,221 | Modigliani | Nov. 6, 1951 |
| 2,604,426 | Beekman | July 22, 1952 |
| 2,718,583 | Noland et al. | Sept. 20, 1955 |